United States Patent
Yamaue et al.

(10) Patent No.: US 11,011,762 B2
(45) Date of Patent: May 18, 2021

(54) FUEL CELL SYSTEM

(71) Applicant: TOYOTA JIDOSHA KABUSHIKI KAISHA, Toyota (JP)

(72) Inventors: Keita Yamaue, Nisshin (JP); Hiroyuki Imanishi, Toyota (JP); Tomotaka Ishikawa, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 134 days.

(21) Appl. No.: 16/444,270

(22) Filed: Jun. 18, 2019

(65) Prior Publication Data

US 2019/0393519 A1    Dec. 26, 2019

(30) Foreign Application Priority Data

Jun. 21, 2018    (JP) .............................. JP2018-117976

(51) Int. Cl.
| | |
|---|---|
| *H01M 8/04029* | (2016.01) |
| *H01M 8/10* | (2016.01) |
| *H01M 8/0432* | (2016.01) |
| *H01M 8/04228* | (2016.01) |
| *H01M 8/0267* | (2016.01) |
| *H01M 8/04225* | (2016.01) |

(52) U.S. Cl.
CPC ..... *H01M 8/04029* (2013.01); *H01M 8/0267* (2013.01); *H01M 8/0432* (2013.01); *H01M 8/04225* (2016.02); *H01M 8/04228* (2016.02); *H01M 8/10* (2013.01)

(58) Field of Classification Search
CPC ........... H01M 2250/20; H01M 8/0267; H01M 8/04029; H01M 8/04044; H01M 8/04225; H01M 8/04228; H01M 8/0432; H01M 8/04537; H01M 8/04768; H01M 8/10
See application file for complete search history.

(56) References Cited

U.S. PATENT DOCUMENTS

| | | | | |
|---|---|---|---|---|
| 2003/0072981 | A1* | 4/2003 | Imaseki ............ | H01M 8/04029 429/434 |
| 2013/0034786 | A1* | 2/2013 | Matsumoto ....... | H01M 8/04089 429/429 |
| 2016/0129808 | A1* | 5/2016 | Bono ................ | H01M 8/04358 429/435 |

FOREIGN PATENT DOCUMENTS

| | | |
|---|---|---|
| JP | 2003-123813 | 4/2003 |
| JP | 2004-311055 | 11/2004 |

* cited by examiner

*Primary Examiner* — Adam A Arciero
(74) *Attorney, Agent, or Firm* — Finnegan, Henderson, Farabow, Garrett & Dunner, LLP

(57) ABSTRACT

When a time period from a stop to a start of a fuel cell system exceeds a predetermined time period, a controller of the fuel cell system obtains a first electrical conductivity of a cooling medium that is placed from a radiator to before a connecting location of one end portion in a cooling medium circulation flow path and a second electrical conductivity of the cooling medium that is placed on a downstream side of an ion exchanger in a bypass flow path, and uses the obtained first electrical conductivity and second electrical conductivity and a predetermined target electrical conductivity of a supply cooling medium to control the operation of a flow dividing valve such that the electrical conductivity of the supply cooling medium becomes equal to or less than the target electrical conductivity and thereby regulate a flow rate ratio.

5 Claims, 3 Drawing Sheets

FUEL CELL SYSTEM

CROSS REFERENCE TO RELATED APPLICATIONS

The present application claims priority from Japanese patent application 2018-117976 filed on Jun. 21, 2018, the entirety of the content of which is hereby incorporated by reference into this application.

BACKGROUND

Field

The present disclosure relates to a technique involved in a fuel cell system.

Related Art

A known configuration of a cooling medium circulation system provided to cool down a fuel cell includes a heat exchanger that releases the heat of a cooling medium and an ion exchanger that removes ions from the cooling medium (as described in, for example, JP 2003-123813A).

When a fuel cell system including the cooling medium circulation system is at stop for a long time period, a larger amount of ions are likely to be eluted from the heat exchanger into the cooling medium and thereby increase the electrical conductivity of the cooling medium. When the cooling medium of the high electrical conductivity is flowed into the fuel cell, this is likely to reduce the resistivity of the cooling medium and to cause an electric leakage through the cooling medium.

SUMMARY

According to one aspect of the present disclosure, there is provided a fuel cell system. This fuel cell system comprises a fuel cell; a radiator configured to release heat of a cooling medium that is used to cool down the fuel cell; a cooling medium circulation flow path configured to cause the cooling medium to be circulated between the fuel cell and the radiator, the cooling medium circulation flow path including a cooling medium supply flow path configured such that a supply cooling medium that is the cooling medium to be supplied to the fuel cell flows through; and a cooling medium discharge flow path configured such that the cooling medium discharged from the fuel cell flows through; a pump placed in the cooling medium circulation flow path and configured to drive the cooling medium; a bypass flow path having one end portion connected with the cooling medium supply flow path and the other end portion connected with the cooling medium discharge flow path, the bypass flow path being configured to cause the cooling medium to flow with bypassing the radiator; a flow dividing valve configured to regulate a flow rate ratio of a flow rate of the cooling medium flowing into the radiator to a flow rate of the cooling medium flowing into the bypass flow path; an ion exchanger provided in the bypass flow path; and a controller configured to control operation of the flow dividing valve. When a time period from a stop to a start of the fuel cell system exceeds a predetermined time period, the controller obtains a first electrical conductivity of the cooling medium that is placed from the radiator to before a connecting location of the one end portion in the cooling medium circulation flow path and a second electrical conductivity of the cooling medium that is placed on a downstream side of the ion exchanger in the bypass flow path, and uses the obtained first electrical conductivity and second electrical conductivity and a predetermined target electrical conductivity of the supply cooling medium to control the operation of the flow dividing valve such that the electrical conductivity of the supply cooling medium becomes equal to or less than the target electrical conductivity and thereby regulate the flow rate ratio.

DETAILED DESCRIPTION

A. Embodiment

Figure 1:
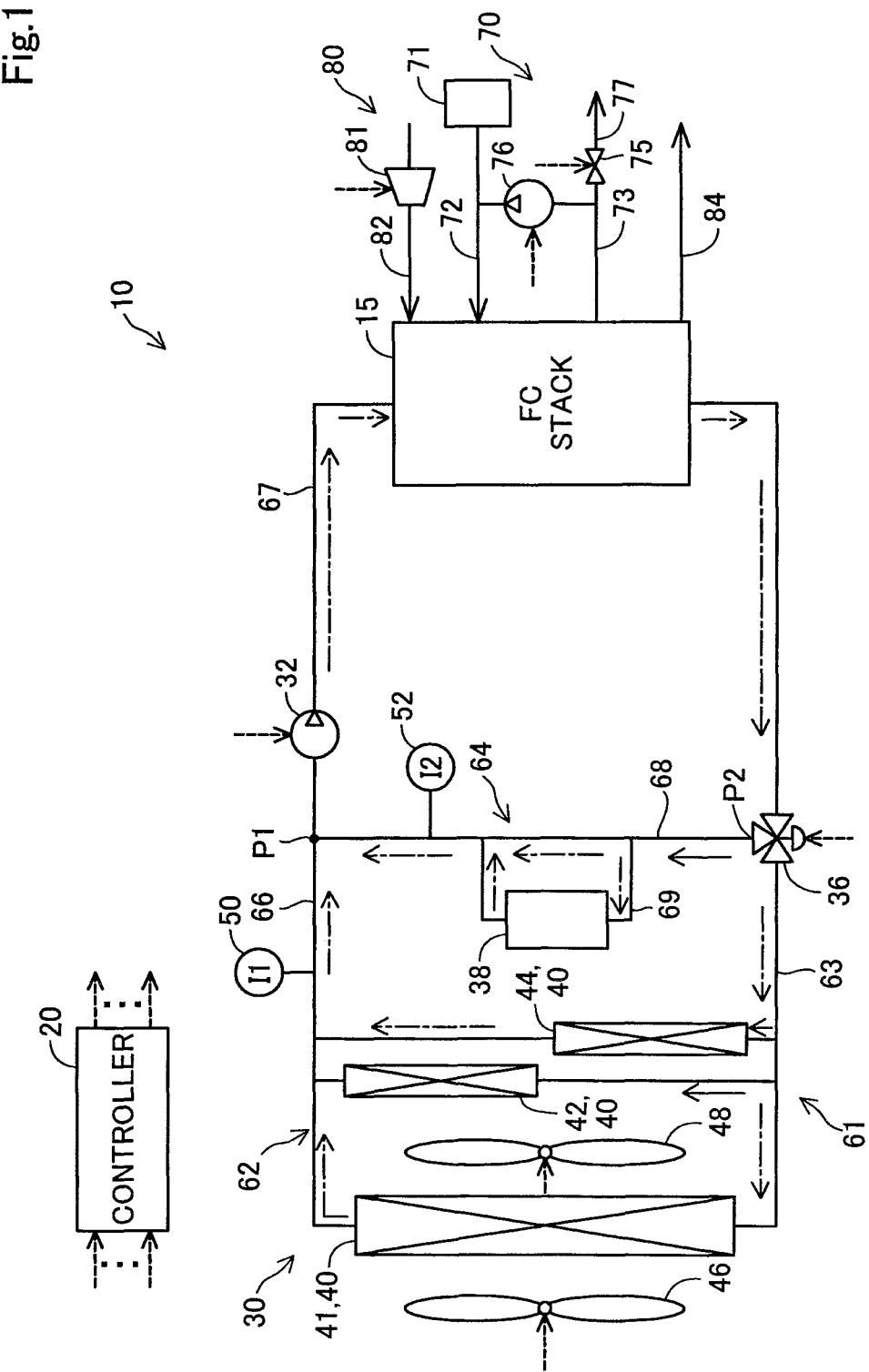
FIG. 1 is a diagram schematically illustrating a fuel cell system according to an embodiment of the present disclosure.

FIG. 1 is a diagram schematically illustrating a fuel cell system 10 according to an embodiment of the present disclosure. Arrows of one-dot chain line in FIG. 1 indicate the flow of a cooling medium. The fuel cell system 10 includes a fuel cell stack 15, a cooling medium circulation system 30, an anode gas supply discharge system 70, a cathode gas supply discharge system 80 and a controller 20. The fuel cell system 10 is mounted as a power source on a vehicle.

The controller 20 is configured to control the operations of the fuel cell system 10. The fuel cell stack 15 is configured to generate electric power by a reaction of an anode gas with a cathode gas. The fuel cell stack 15 has a stacked structure of a plurality of unit fuel cells (not shown). According to the embodiment, the unit fuel cells are polymer electrolyte fuel cells that generate electricity by an electrochemical reaction of oxygen with hydrogen.

The anode gas supply discharge system 70 includes an anode gas tank 71, an anode gas supply flow path 72, an anode gas circulation flow path 73, a circulation pump 76, an exhaust/drain valve 75, and an exhaust/drain flow path 77.

The anode gas tank 71 is configured to store, for example, high-pressure hydrogen gas. The anode gas tank 71 is connected with the fuel cell stack 15 via the anode gas supply flow path 72. The anode gas supply flow path 72 causes the anode gas stored in the anode gas tank 71 to be flowed to the fuel cell stack 15. The flow rate of the anode gas supplied from the anode gas tank 71 to the fuel cell stack 15 is regulated by a control valve (not shown) provided in the anode gas supply flow path 72.

The anode gas circulation flow path 73 is connected with the fuel cell stack 15 and with the anode gas supply flow path 72 to cause an anode off-gas discharged from the fuel cell stack 15 to be circulated to the anode gas supply flow path 72. The exhaust/drain valve 75 is opened at a predetermined timing, in response to a command from the controller 20. This causes the anode off-gas including liquid water to be released through the exhaust/drain flow path 77 to outside of the system.

The cathode gas supply discharge system 80 includes a cathode gas supply flow path 82, a cathode gas discharge flow path 84 and a compressor 81. The cathode gas supply discharge system 80 is configured to supply the air as the cathode gas through the cathode gas supply flow path 82 to the fuel cell stack 15 and to discharge a cathode off-gas (unused cathode gas) discharged from the fuel cell stack 15 out of the system.

The cathode gas supplied to the fuel cell stack 15 is flowed through the cathode gas supply flow path 82. The compressor 81 serves to discharge the cathode gas flowing through the cathode gas supply flow path 82 toward the fuel cell stack 15. The operation of the compressor 81 is controlled by the controller 20.

The cathode off-gas placed on the downstream side of the fuel cell stack 15 is flowed through the cathode gas discharge flow path 84. The cathode off-gas flowing through the cathode gas discharge flow path 84 is released to outside of the system.

The cooling medium circulation system 30 is configured to regulate the temperature of the fuel cell stack 15 by using the cooling medium. The cooling medium used may be an antifreezing fluid such as ethylene glycol or cooling water. According to the embodiment, cooling water is used as the cooling medium.

The cooling medium circulation system 30 includes a cooling medium circulation flow path 61 and a bypass flow path 64. The cooling medium circulation system 30 also includes a main radiator 41, a first sub-radiator 42, a second sub-radiator 44, a main radiator fan 46, a sub-radiator fan 48, a pump 32, a flow dividing valve 36, and an ion exchanger 38. The cooling medium circulation system 30 further includes a first conductivity meter 50 and a second conductivity meter 52. When there is no need to distinguish the main radiator 41, the first sub-radiator 42 and the second sub-radiator 44 from one another, these radiators are called "radiator 40".

The cooling medium circulation flow path 61 is a piping arranged to circulate the cooling medium between the fuel cell stack 15 and the radiator 40. The cooling medium circulation flow path 61 is electrically connected with a body earth. The cooling medium circulation flow path 61 includes a cooling medium supply flow path 62 and a cooling medium discharge flow path 63. The supply cooling medium that is the cooling medium to be supplied to the fuel cell stack 15 is flowed through the cooling medium supply flow path 62. An upstream portion of the cooling medium supply flow path 62 that is on the upstream side of a location where the bypass flow path 64 is connected (connecting location) is called upstream-side supply flow path 66, and a downstream portion on the downstream side of the connecting location is called downstream-side supply flow path 67. The cooling medium discharged from the fuel cell stack 15 is flowed through the cooling medium discharge flow path 63.

The bypass flow path 64 has one end portion P1 connected with the cooling medium supply flow path 62 and the other end portion P2 connected with the cooling medium discharge flow path 63. The bypass flow path 64 causes the cooling medium to bypass the radiator 40 and to be flowed from the cooling medium discharge flow path 63 to the cooling medium supply flow path 62. The bypass flow path 64 includes a main bypass flow path 68 having the one end portion P1 and the other end portion P2, and a sub-bypass flow path 69 where the ion exchanger 38 is placed. The sub-bypass flow path 69 is a piping that is branched off from the main bypass flow path 68 and that is joined again with the main bypass flow path 68. Placing the ion exchanger 38 in the sub-bypass flow path 69 suppresses an increase in pressure loss of the entire bypass flow path 64.

The radiator 40 serves to release the heat of the cooling medium that is used to cool down the fuel cell stack 15. The main radiator 41 is cooled down by the blast from the main radiator fan 46. The first sub-radiator 42 and the second sub-radiator 44 are cooled down by the blast from the sub-radiator fan 48. The operations of the main radiator fan 46 and the sub-radiator fan 48 are controlled by the controller 20.

The radiator 40 causes ions (for example, potassium ion and fluoride ion) to be eluted into the cooling medium. The following may be a cause of this elution. The manufacturing procedure of the radiator 40 includes a removal process of removing an oxide film. The components of a flux as the material used for removal of the oxide film are eluted in the form of ions into the cooling medium. Even when the manufacturing procedure does not include the removal process of the oxide film, other types of ions are likely to be eluted from the radiator 40 into the cooling medium.

The pump 32 is placed in the cooling medium supply flow path 62 and serves to drive the cooling medium and thereby feed the cooling medium toward the downstream side. The cooling medium is accordingly circulated through the cooling medium circulation flow path 61. The operation of the pump 32 is controlled by the controller 20. The pump 32 is electrically connected with the body earth.

The flow dividing valve 36 is configured to change its opening position in response to a command from the controller 20 and thereby regulate a flow rate ratio of the flow rate of the cooling medium flowing into the radiator 40 to the flow rate of the cooling medium flowing into the bypass flow path 64. According to the embodiment, a rotary valve is employed as the flow dividing valve 36. The flow dividing valve 36 is provided in a connecting location of the cooling medium discharge flow path 63 and the bypass flow path 64. When the opening position of the flow dividing valve 36 is a fully opened position (opening position of 100%), the entire amount of the cooling medium flowing into the flow dividing valve 36 is flowed into the bypass flow path 64. When the opening position of the flow dividing valve 36 is a fully closed position (opening position of 0%), on the other hand, the entire amount of the cooling medium flowing into the flow dividing valve 36 is flowed into the radiator 40. The opening position of the flow dividing valve 36 may be changed between 0% and 100%.

The ion exchanger 38 is provided in the sub-bypass flow path 69 of the bypass flow path 64. The ion exchanger 38 is filled with an ion exchange resin. The ion exchanger 38 serves to remove the ions eluted into the cooling medium by using the ion exchange resin.

The first conductivity meter 50 is configured to measure a first electrical conductivity (μS/cm) of the cooling medium that is placed from the radiator 40 to before a connecting location of the first end portion P1 in the cooling medium circulation flow path 61. The measured first electrical conductivity is sent to the controller 20. According to the embodiment, the first conductivity meter 50 is provided in the upstream-side supply flow path 66 that is an outlet side of the radiator 40 in the cooling medium supply flow path 62. More specifically, the first conductivity meter 50 is provided on the downstream side of the main radiator 41, the first sub-radiator 42 and the second sub-radiator 44 and on the upstream side of the one end portion P1 in the upstream-side supply flow path 66.

The second conductivity meter 52 is configured to measure a second electrical conductivity (μS/cm) of the cooling medium that is placed on the downstream side of the ion exchanger 38 in the bypass flow path 64. The measured second electrical conductivity is sent to the controller 20. According to the embodiment, the second conductivity meter 52 is provided on the downstream side of a location where a downstream end of the sub-bypass flow path 69 is joined in the main bypass flow path 68.

The controller 20 performs temperature control of controlling the operations of the pump 32, the main radiator fan 46, the sub-radiator fan 48 and the flow dividing valve 36 with a view to regulating the temperature of the fuel cell stack 10 during operation of the fuel cell stack 10. On a start of the fuel cell system 10 in response to an ON operation of a start switch of the vehicle, the controller 20 performs conductivity reduction control using the cooling medium circulation system 30 prior to the temperature control, when a stop time period from a stop to the start of the fuel cell system 10 exceeds a first reference value that denotes a time period determined in advance. The start switch of the vehicle is kept off in the stop time period. The conductivity reduction control denotes control of reducing the electrical conductivity of the cooling medium that is to be supplied to the fuel cell stack 15, i.e., the supply cooling medium, in the downstream-side supply flow path 67 to be equal to or less than a target electrical conductivity determined in advance. The details of the conductivity reduction control will be described later.

Figure 2:
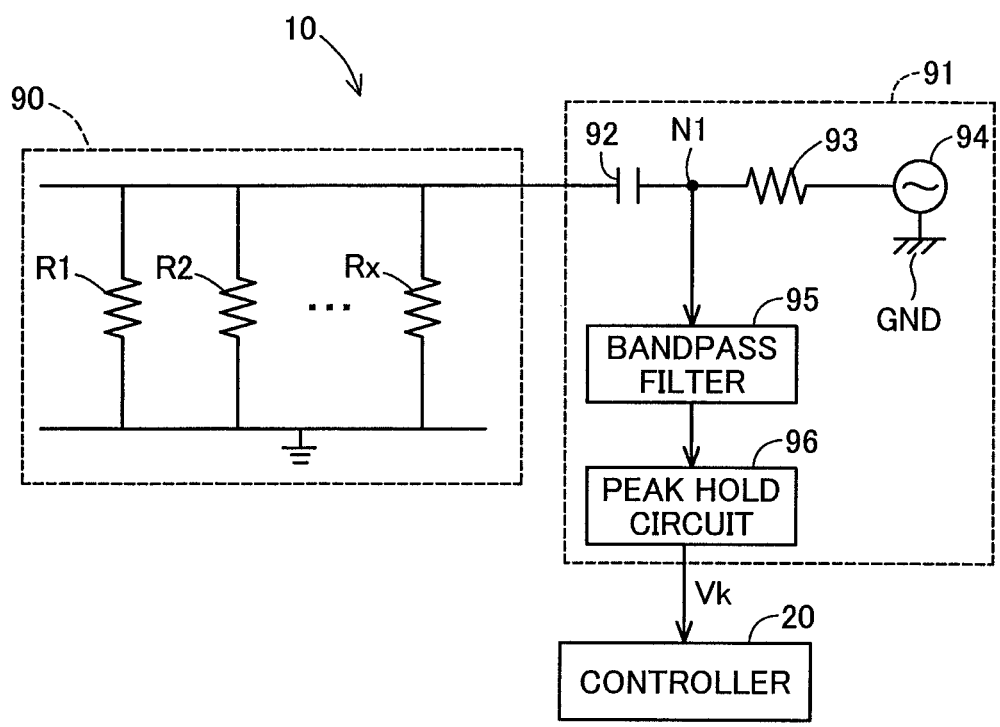
FIG. 2 is a diagram illustrating an electric leakage detector in the fuel cell system.

FIG. 2 is a diagram illustrating an electric leakage detector 91 in the fuel cell system 10. The fuel cell system 10 further includes the electric leakage detector 91. The electric leakage detector 91 is configured to detect a peak value Vk of the entire fuel cell system 10. The detected peak value Vk is sent to the controller 20.

A circuit diagram of FIG. 2 illustrates a circuit system 90 including elements of the fuel cell system 10 having electric resistances. Respective resistances R1, R2, . . . , Rx in the circuit system 90 indicate resistances of the respective elements of the fuel cell system 10 (for example, the compressor 81, a motor of the main radiator fam 46, a motor of the sub-radiator fan 48, and the cooling medium circulation flow path 61 shown in FIG. 1).

The electric leakage detector 91 includes an AC power source 94, a resistance 93, a capacitor 92, a bandpass filter 95 and a peak hold circuit 96.

The AC power source 94 and the resistance 93 are connected in series between a node N1 and a ground node GND (chassis or body of the vehicle). The capacitor 92 is connected between the node N1 and the circuit system 90.

The AC power source 94 outputs an AC signal of a low frequency. The AC signal is a signal used for detection of an electric leakage. According to the embodiment, the AC signal has a frequency of 2.5 Hz and has a voltage of 5 V. The AC signal is input into the circuit system 90 via the capacitor 92. Accordingly, the circuit system 90 forming a DC power circuit is galvanically isolated from the electric leakage detector 91. Accordingly, the circuit system 90 is isolated from the ground.

The bandpass filter 95 receives input of an AC signal on the node N1. The bandpass filter 95 extracts a 2.5 Hz component from the input AC signal and causes the extracted 2.5 Hz AC signal to be input into the peak hold circuit 96. The peak hold circuit 96 holds the peak of the 2.5 Hz AC signal input from the bandpass filter 95 and sends the held peak as a peak value Vk to the controller 20.

The peak value Vk varies according to the occurrence or non-occurrence of an electric leakage. More specifically, the peak value Vk decreases with a decrease in value of insulation resistance due to the occurrence of an electric leakage. Accordingly, a reduction of the insulation resistance is detectable by monitoring the peak value Vk. The peak value Vk that is greater than a third reference value is a normal peak value Vk. When the peak value Vk is the normal value, it is determined that the insulation resistance is normal and that no electric leakage occurs. The state that the peak value Vk is equal to or less than the third reference value may be expressed as the state of reduction of the insulation resistance. The reduction of the insulation resistance indicates the occurrence of an electric leakage.

Figure 3:
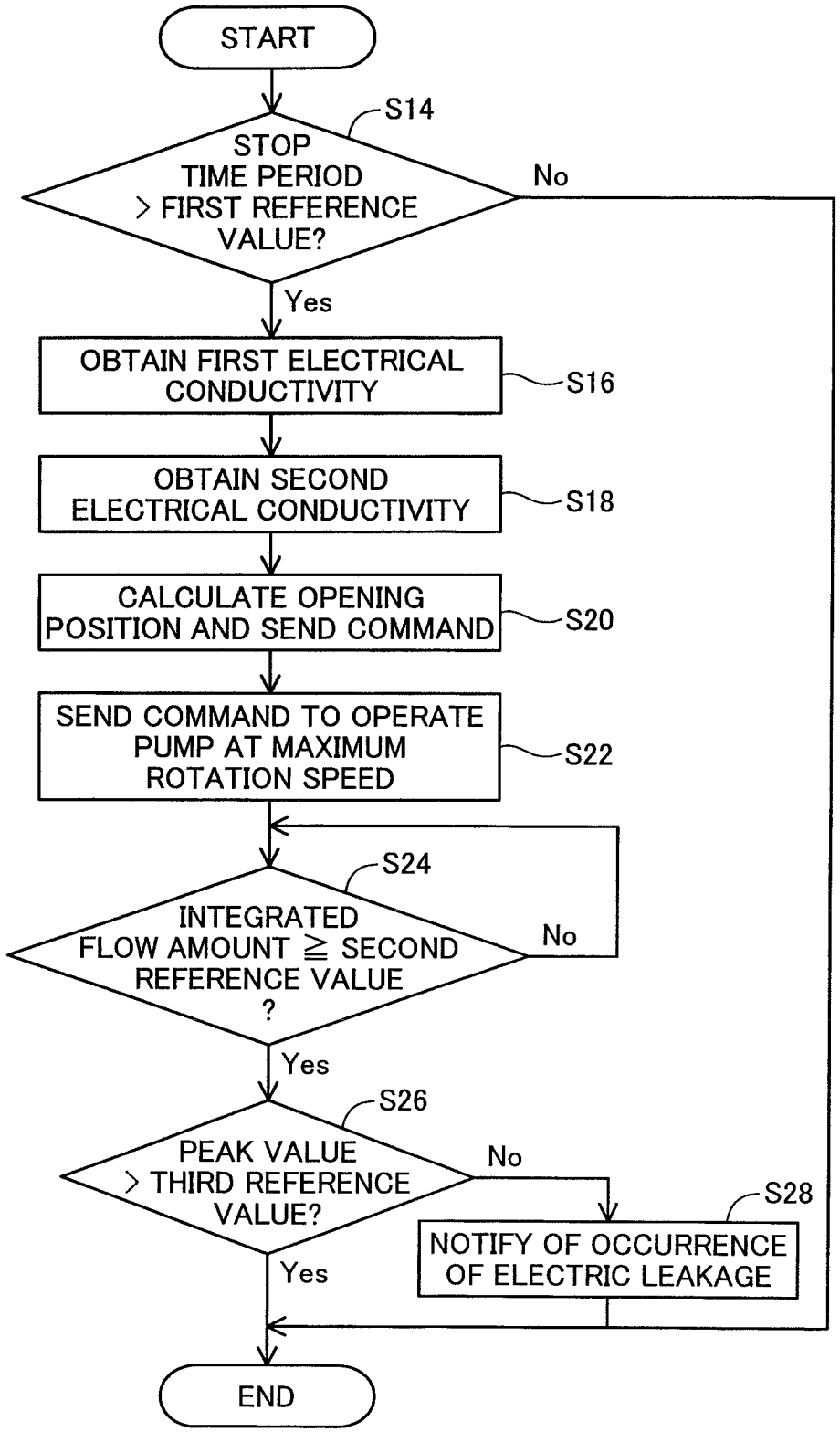
FIG. 3 is a flowchart showing a conductivity reduction control performed by a controller.

FIG. 3 is a flowchart showing the conductivity reduction control performed by the controller 20. This flowchart is triggered by a start of the fuel cell system 10 in response to a changeover of the start switch from OFF to ON. The controller 20 first determines whether a stop time period from a stop to a start of the fuel cell system 10 exceeds a first reference value (step S14). The stop time period of the fuel cell system 10 is measured by a timer of the controller 20. The first reference value is set to a time period when an electrical conductivity of the cooling medium in the upstream-side supply flow path 66 that is estimated from the amount of elution of the ions from the radiator 40 into the cooling medium during the stop time period of the fuel cell system 10 is expected to become significantly greater (for example, twice or more) than a target electrical conductivity. For example, the first reference value may be set to any time in a range of one week (168 hours) to two weeks (336 hours). According to the embodiment, the first reference value is set to one week (168 hours).

When the stop time period is equal to or less than the first reference value, the controller 20 terminates the conductivity reduction control. When the stop time period exceeds the first reference value, on the other hand, the controller 20 obtains a first electrical conductivity that is an electrical conductivity on the radiator 40-side from the first conductivity meter 50 (step S16). The controller 20 also obtains a second electrical conductivity that is an electrical conductivity on the bypass flow path 64-side from the second conductivity meter 52 (step S18).

The controller 20 subsequently uses the obtained first electrical conductivity and second electrical conductivity and a predetermined target electrical conductivity of the supply cooling medium to calculate the opening position of the flow dividing valve 36 such that the electrical conductivity of the supply cooling medium becomes equal to or less than the target electrical conductivity, and sends a command to the flow dividing valve 36 to have the calculated opening position (step S20). The flow dividing valve 36 receives the command and is operated to have the calculated opening position indicated by the command. This regulates the flow rate ratio of the flow rate of the cooling medium flowing into the radiator 40 to the flow rate of the cooling medium flowing into the bypass flow path 64. The controller 20 calculates the opening position of the flow dividing valve 36 according to Expression (2) that is obtained from Expression (1) given below. According to the embodiment, the controller 20 calculates the opening position of the flow dividing valve 36 such that the electrical conductivity of the supply cooling medium becomes equal to the target electrical conductivity and regulates the flow rate ratio.

[Math. 1]
$$\sigma 1 \times \left(1 - \frac{\Phi}{100}\right) + \sigma 2 \times \frac{\Phi}{100} = \sigma 3 \tag{1}$$

[Math. 2]
$$\Phi = \left(\frac{\sigma 3 - \sigma 1}{\sigma 2 - \sigma 1}\right) \times 100 \tag{2}$$

where σ1 denotes the first electrical conductivity, σ2 denotes the second electrical conductivity, σ3 denotes the target electrical conductivity, and φ denotes the opening position (%) of the flow dividing valve 36.

For example, when the first electrical conductivity is 50 μS/cm, the second electrical conductivity is 15.8 μS/cm and the target electrical conductivity is 16.5 μS/cm, the controller 20 substitutes these values into Expression (2) to calculate the opening position of the flow dividing valve 36. In this case, the calculated opening position of the flow dividing valve 36 is 98%. This means that 98% of the cooling medium flowing into the flow dividing valve 36 is flowed into the bypass flow path 64, and the remaining 2% is flowed into the radiator 40.

Subsequent to step S20, the controller 20 sends a command to the pump 32 to be operated at a maximum rotation speed (step S22). The pump 32 receives the command and is operated at the maximum rotation speed. The maximum rotation speed may be, for example, a theoretical value written in a catalog of the motor of the pump 32. Operating the pump 32 at the maximum rotation speed maximizes the discharge flow rate of the pump 32.

The controller 20 subsequently determines whether an integrated flow amount of the cooling medium since the start of the conductivity reduction control becomes equal to or greater than a second reference value (step S24). The integrated flow amount denotes an integrated flow amount of the cooling medium flowing into the radiator 40 and is calculated from the opening position of the flow dividing valve 36, an operation time of the pump 32 since the start of the conductivity reduction control and a rotation speed of the pump 32 (the maximum rotation speed according to the embodiment). The second reference value is set to be equal to or greater than a total capacity of the cooling medium of the main radiator 41, the first sub-radiator 42 and the second sub-radiator 44. According to the embodiment, the second reference value is set to the total capacity of the cooling medium.

The determination of step S24 is repeatedly performed until the integrated flow amount reaches the second reference value. When the integrated flow amount becomes equal to or greater than the second reference value, the controller 20 proceeds to step S26. When the integrated flow amount becomes equal to or greater than the second reference value, it is determinable that the cooling medium of the high electrical conductivity placed in the radiator 40 prior to the start of the conductivity reduction control is replaced with the cooling medium of the low electrical conductivity. This configuration reduces the possibility that the electrical conductivity of the supply cooling medium that is to be supplied to the fuel cell stack 15 exceeds the target electrical conductivity after termination of the conductivity reduction control.

At step S26, the controller 20 determines whether the peak value Vk is greater than the third reference value. When the peak value Vk is greater than the third reference value, the controller 20 terminates the conductivity reduction control. When the peak value Vk is equal to or less than the third reference value, on the other hand, the controller 20 notifies the surroundings of the occurrence of an electric leakage (step S28) and then terminates the conductivity reduction control. The occurrence of an electric leakage may be notified, for example, by output of alarm sound or by display of the occurrence of an electric leakage on a monitor of the vehicle. When the integrated flow amount becomes equal to or greater than the second reference value, the electrical conductivity of the cooling medium is equal to or less than the target electrical conductivity. Even in this case, when the peak value Vk is equal to or less than the third reference value, an electric leakage is more likely to occur in an element of the fuel cell system 10 (for example, the compressor 81) other than the cooling medium circulation flow path 61. Accordingly, the controller 20 performs the processing of step S28 as described above.

According to the above embodiment, when the stop time period of the fuel cell system 10 exceeds the first reference value on a start of the fuel cell system 10, the controller 20 controls the opening position of the flow dividing valve 36 such that the electrical conductivity of the supply cooling medium flowing through the downstream-side supply flow path 67 becomes equal to or less than the target electrical conductivity and regulates the flow rate ratio. Even when the fuel cell system 10 is at stop for a long time period and a larger amount of ions are eluted from the radiator 40 into the cooling medium, such control reduces the possibility that the cooling medium of the high electrical conductivity is supplied to the fuel cell stack 15. Regulating the ratio of the flow rate of the cooling medium flowing into the radiator 40 to the flow rate of the cooling medium flowing into the bypass flow path 64 reduces the electrical conductivity of the supply cooling medium. The radiator 40 is thus not required to be subjected to a preliminary washing process for the purpose of reducing elution of ions into the cooling medium. This reduces the cost of the radiator 40.

In general, the ion exchanger 38 increases the exchange ratio of ions in the cooling medium (ion exchange ratio) with an increase in flow rate of the cooling medium flowing in the ion exchanger 38. According to the above embodiment, the controller 20 causes the pump 32 to be operated at the maximum rotation speed, when regulating the flow rate ratio by the conductivity reduction control. This enables a higher flow rate of the cooling medium to be flowed into the ion exchanger 38 and thereby enables a larger amount of ions in the cooling medium to be removed from the cooling medium.

B. Other Embodiments

B-1. Another Embodiment 1

According to the above embodiment, the controller 20 obtains the first electrical conductivity from the first conductivity meter 50 and obtains the second electrical conductivity from the second conductivity meter 52. The procedure of obtaining the first electrical conductivity and the second electrical conductivity is, however, not limited to this embodiment. In another embodiment, the controller 20 may calculate the first electrical conductivity by using the stop time period of the fuel cell system 10, the amount of ions eluted from the radiator 40 per unit time, the capacity of the cooling medium in the radiator 40, and the types of the ions eluted. The controller 20 may calculate the second electrical conductivity by using the stop time period of the fuel cell system 10, the amount of ions eluted from a component other than the radiator 40 (for example, a pipe forming the cooling medium circulation flow path 61) per unit time, the capacity of the cooling medium in the cooling medium circulation flow path 61 and the types of the ions eluted. In another embodiment, the controller 20 may calculate the second electrical conductivity according to Expression (3) given below from the target electrical conductivity and an ion exchange ratio of the ion exchanger 38. The ion exchange ratio is an ion exchange ratio of the entire bypass flow path 64 and denotes a removal ratio (%) of the amount of ions after the sub-bypass flow path 69 is joined with the main bypass flow path 68 to the amount of ions before the sub-bypass flow path 69 is joined with the main bypass flow path 68:

$$\text{second electrical conductivity} = \text{target electrical conductivity} \times (100 - \text{ion exchange ratio})/100 \qquad (3)$$

B-2. Another Embodiment 2

According to the above embodiment, the controller 20 performs the processing of step S26 shown in FIG. 3 when the integrated flow amount becomes equal to or greater than the second reference value. This is, however, not essential. In another embodiment, the controller 20 may perform the processing of step S26 when the first electrical conductivity obtained from the first conductivity meter 50 becomes equal to or less than the target electrical conductivity. In another embodiment, the processing of step S26 and step S28 may be omitted.

B-3. Another Embodiment 3

According to the above embodiment, the controller 20 causes the pump 32 to be operated at the maximum rotation speed in the conductivity reduction control. This is, however, not essential, but the pump 32 may be operated at a lower rotation speed than the maximum rotation speed.

B-4. Another Embodiment 4

According to the above embodiment, the rotary valve is employed as the flow dividing valve 36. Another control valve may, however, be employed, as along as the control valve is configured to divide the flow of the cooling medium in the cooling medium discharge flow path 63 into the bypass flow path 64-side and the radiator 40-side. In another embodiment, an electromagnetic three-way valve may be employed as the flow dividing valve 36. In another embodiment, the flow dividing valve 36 may be configured by two independent control valves. In this embodiment, one control valve may be placed on the upstream side of the connecting location of the sub-bypass flow path 69 with the main bypass flow path 68 and may regulate the flow rate of the cooling medium flowing into the bypass flow path 64 by changing the opening position of the control valve. The other control valve may be placed between the other end portion P2 and the radiator 40 in the cooling medium discharge flow path 63 and may regulate the flow rate of the cooling medium flowing into the radiator 40 by changing the opening position of the control valve.

B-5. Another Embodiment 5

According to the above embodiment, the bypass flow path 64 includes the sub-bypass flow path 69 where the ion exchanger 38 is placed. In another embodiment, the sub-bypass flow path 69 may be omitted, and the ion exchanger 38 may be placed in the main bypass flow path 68. According to the above embodiment, the fuel cell system 10 is provided with the main radiator 41, the first sub-radiator 42 and the second sub-radiator 44. The number of radiators is, however, not limited to this embodiment but may be one or more.

B-6. Another Embodiment 6

According to the above embodiment, the controller 20 calculates the opening position of the flow dividing valve 36 such that the electrical conductivity of the supply cooling medium becomes equal to the target electrical conductivity and thereby regulates the flow rate ratio. Another embodiment may calculate the opening position of the flow dividing valve 36 by using a smaller value than the target electrical conductivity and thereby regulate the flow rate ratio.

B-7. Another Embodiment 7

In another embodiment, a branch flow path may be provided to cause the cooling medium to bypass the fuel cell stack and to be flowed from the downstream-side supply flow path 67 to the cooling medium discharge flow path 63, and an intercooler may be placed in this branch flow path. The intercooler may be used to cool down the cathode gas discharged from the compressor 81.

The present disclosure is not limited to the embodiment or the other embodiments described above but includes various modifications. For example, the above embodiment is described in detail only for the better understanding of the present disclosure and is not necessarily limited to the configuration that includes all the components described above. Part of the configuration of the above embodiment may be replaced by the configuration of another embodiment or a modification. The configuration of another embodiment or a modification may be added to the configuration of the above embodiment. Part of the configuration of each of the embodiments may be omitted, may be replaced or may be combined with another configuration. The above embodiment may be configured in combination with any of the other embodiments and any of the modifications. The present disclosure may be implemented by aspects described below.

(1) According to one aspect of the present disclosure, there is provided a fuel cell system. This fuel cell system comprises a fuel cell; a radiator configured to release heat of a cooling medium that is used to cool down the fuel cell; a cooling medium circulation flow path configured to cause the cooling medium to be circulated between the fuel cell and the radiator, the cooling medium circulation flow path including a cooling medium supply flow path configured such that a supply cooling medium that is the cooling medium to be supplied to the fuel cell flows through; and a cooling medium discharge flow path configured such that the cooling medium discharged from the fuel cell flows through; a pump placed in the cooling medium circulation flow path and configured to drive the cooling medium; a bypass flow path having one end portion connected with the cooling medium supply flow path and the other end portion connected with the cooling medium discharge flow path, the bypass flow path being configured to cause the cooling medium to flow with bypassing the radiator; a flow dividing valve configured to regulate a flow rate ratio of a flow rate of the cooling medium flowing into the radiator to a flow rate of the cooling medium flowing into the bypass flow path; an ion exchanger provided in the bypass flow path; and a controller configured to control operation of the flow dividing valve. When a time period from a stop to a start of the fuel cell system exceeds a predetermined time period, the controller obtains a first electrical conductivity of the cooling medium that is placed from the radiator to before a connecting location of the one end portion in the cooling medium circulation flow path and a second electrical conductivity of the cooling medium that is placed on a downstream side of the ion exchanger in the bypass flow path, and uses the obtained first electrical conductivity and second electrical conductivity and a predetermined target electrical conductivity of the supply cooling medium to control the operation of the flow dividing valve such that the electrical conductivity of the supply cooling medium becomes equal to or less than the target electrical conductivity and thereby regulate the flow rate ratio. In the fuel cell system of this aspect, when the stop time period of the fuel cell system exceeds the predetermined time period, the controller controls the operation of the flow dividing valve such that the electrical conductivity of the supply cooling medium becomes equal to or less than the target electrical conductivity and thereby regulates the flow rate ratio. Even when the fuel cell system is at stop for a long time period and a larger amount of ions are eluted from the radiator into the cooling medium, this configuration reduces the possibility that the cooling medium of the high electrical conductivity is supplied to the fuel cell.

(2) In the fuel cell system of the above aspect, the controller may cause the pump to be operated at a maximum rotation speed, when regulating the flow rate ratio. In general, the ion exchanger increases an exchange ratio of ions in the cooling medium with an increase in flow rate of the cooling medium flowing in the ion exchanger. In the fuel cell system of this aspect, the controller may cause the pump to be operated at the maximum rotation speed. This configuration enables a higher flow rate of the cooling medium to be flowed into the ion exchanger and thereby enables a larger amount of ions in the cooling medium to be removed from the cooling medium.

(3) In the fuel cell system of the above aspect, when an integrated flow amount of the cooling medium flowing into the radiator since a start of regulation of the flow rate ratio becomes equal to a predetermined reference value that is equal to or greater than a capacity of the cooling medium in the radiator, the controller may terminate the regulation of the flow rate ratio. In the fuel cell system of this aspect, when the integrated flow amount becomes equal to or greater than the capacity of the cooling medium, the cooling medium of the high electrical conductivity placed in the radiator prior to the regulation of the flow rate ratio is replaced with the cooling medium of the low electrical conductivity. This configuration reduces the possibility that the electrical conductivity of the supply cooling medium that is to be supplied to the fuel cell exceeds the target electrical conductivity.

The present disclosure may be implemented various aspect other than those described above, for example, a control method of the fuel cell system and a vehicle with the fuel cell system mounted thereon.

What is claimed is:

1. A fuel cell system, comprising:
   a fuel cell;
   a radiator configured to release heat of a cooling medium that is used to cool down the fuel cell;
   a cooling medium circulation flow path configured to cause the cooling medium to be circulated between the fuel cell and the radiator, the cooling medium circulation flow path including a cooling medium supply flow path configured such that a supply cooling medium that is the cooling medium to be supplied to the fuel cell flows through; and a cooling medium discharge flow path configured such that the cooling medium discharged from the fuel cell flows through;
   a pump placed in the cooling medium circulation flow path and configured to drive the cooling medium;
   a bypass flow path having one end portion connected with the cooling medium supply flow path and the other end portion connected with the cooling medium discharge flow path, the bypass flow path being configured to cause the cooling medium to flow with bypassing the radiator;
   a flow dividing valve configured to regulate a flow rate ratio of a flow rate of the cooling medium flowing into the radiator to a flow rate of the cooling medium flowing into the bypass flow path;
   an ion exchanger provided in the bypass flow path; and
   a controller programmed to control operation of the flow dividing valve, wherein the controller is programmed to:
      when a time period from a stop to a start of the fuel cell system exceeds a predetermined time period, obtain a first electrical conductivity of the cooling medium that is placed from the radiator to before a connecting location of the one end portion in the cooling medium circulation flow path and a second electrical conductivity of the cooling medium that is placed on a downstream side of the ion exchanger in the bypass flow path, and
      use the obtained first electrical conductivity and second electrical conductivity and a predetermined target electrical conductivity of the supply cooling medium to control the operation of the flow dividing valve such that the electrical conductivity of the supply cooling medium becomes equal to or less than the target electrical conductivity and thereby regulate the flow rate ratio.

2. The fuel cell system according to claim 1, wherein the controller is programmed to cause the pump to be operated at a maximum rotation speed, when regulating the flow rate ratio.

3. The fuel cell system according to claim 1, wherein the controller is programmed to terminate regulation of the flow rate ratio when an integrated flow amount of the cooling medium flowing into the radiator since a start of the regulation of the flow rate ratio becomes equal to a predetermined reference value that is equal to or greater than a capacity of the cooling medium in the radiator.

4. The fuel cell system according to claim 1, wherein the bypass flow path includes a main bypass flow path and a sub-bypass flow path that is branched off from the main bypass flow path and that is joined again with the main bypass flow path, and wherein the ion exchanger is provided in the sub-bypass flow path.

5. The fuel cell system according to claim 1, wherein the controller is programmed to control an opening position of the flow dividing valve according to:

$$\Phi = \left(\frac{\sigma_3 - \sigma_1}{\sigma_2 - \sigma_1}\right) \times 100$$

wherein $\sigma 1$ is the obtained first electrical conductivity, $\sigma 2$ is the obtained second electrical conductivity, $\sigma 3$ is the predetermined target electrical conductivity, and $\Phi$ is the opening position of the flow dividing valve.

* * * * *